United States Patent
Aoki et al.

(10) Patent No.: US 8,882,352 B2
(45) Date of Patent: Nov. 11, 2014

(54) MOTION GUIDE DEVICE

(71) Applicant: THK Co., Ltd., Tokyo (JP)

(72) Inventors: Shinji Aoki, Tokyo (JP); Makiko Okamoto, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 14/351,951

(22) PCT Filed: Oct. 30, 2012

(86) PCT No.: PCT/JP2012/077973
§ 371 (c)(1),
(2), (4) Date: Apr. 15, 2014

(87) PCT Pub. No.: WO2013/065663
PCT Pub. Date: May 10, 2013

(65) Prior Publication Data
US 2014/0254961 A1    Sep. 11, 2014

(30) Foreign Application Priority Data
Nov. 4, 2011    (JP) .................................. 2011-242145

(51) Int. Cl.
*F16C 29/06*    (2006.01)

(52) U.S. Cl.
CPC .................................. *F16C 29/0638* (2013.01)
USPC ........................................................ 384/45

(58) Field of Classification Search
CPC ............. F16C 29/0635; F16C 29/0638; F16C 29/064; F16C 29/0642; F16C 29/0645; F16C 29/0647
USPC .................................................... 384/43, 45
See application file for complete search history.

(56) References Cited

U.S. PATENT DOCUMENTS

| 6,676,295 | B2 * | 1/2004 | Kasuga et al. | 384/45 |
| 7,677,804 | B2 * | 3/2010 | Geka et al. | 384/45 |
| 7,891,876 | B2 * | 2/2011 | Rudy | 384/45 |
| 7,980,763 | B2 * | 7/2011 | Michioka et al. | 384/43 |

FOREIGN PATENT DOCUMENTS

| JP | 59-103928 U | 7/1984 |
| JP | 2004-68880 A | 3/2004 |
| JP | 2007-232050 A | 9/2007 |
| JP | 2010-139008 A | 6/2010 |
| JP | 2010-169183 A | 8/2010 |

OTHER PUBLICATIONS

International Search Report dated Feb. 5, 2013 issued in corresponding application No. PCT/JP2012/077973.

* cited by examiner

*Primary Examiner* — Phillip A Johnson
(74) *Attorney, Agent, or Firm* — Westerman, Hattori, Daniels & Adrian, LLP (57) ABSTRACT

Provided is a motion guide device capable of preventing a lid member from being damaged due to collision of balls and operating a moving block on a track rail at high speed. The motion guide device includes: a track member having a ball rolling surface; a moving member main body having a load ball rolling surface that forms a load ball path between the load ball rolling surface and the ball rolling surface, and a ball return path provided in parallel to the load ball path); a lid member having a direction changing path that connects the load ball path and the ball return path to each other to form an endless circulation path; and balls arranged in the endless circulation path. The lid member includes an introducing portion of the direction changing path, which includes a first contact surface continuous with the direction changing path.

7 Claims, 9 Drawing Sheets

MOTION GUIDE DEVICE

TECHNICAL FIELD

The present invention relates to a motion guide device in which a moving block is assembled to a track rail through intermediation of a large number of endlessly circulating rolling elements such as balls and rollers, to thereby enable free reciprocating motion of an article fixed and mounted onto the moving block along the track rail.

BACKGROUND ART

As the above-mentioned motion guide device, there is known a motion guide device described in Patent Literature 1. The motion guide device described in Patent Literature 1 includes a track rail having a ball rolling surface formed along its longitudinal direction, and a moving block that is assembled to the track rail through intermediation of balls that roll on the ball rolling surface and includes an endless circulation path for the balls. The moving block includes a block main body and a pair of end plates. The block main body has a load ball rolling surface that is opposed to the ball rolling surface of the track rail to form a load ball path for the balls, and a ball return hole for circulating the balls. The pair of end plates has a direction changing path connecting the load ball path and the ball return hole to each other and is fixed to both front and rear end surfaces of the block main body. The balls are circulated through the endless circulation path for the balls, which is provided in the moving block, and thus the moving block can continuously move along the longitudinal direction of the track rail.

In the related-art motion guide device constructed as described above, a scooping portion is provided to the end plate, to thereby scoop the balls having rolled on the ball rolling surface formed in the track rail to guide the balls into the direction changing path formed in the end plate. In such a system of guiding the balls, the scooping portion is required to be arranged at a substantially wedge-shaped space that is formed between a ball spherical surface and the ball rolling surface formed in the track rail, and the scooping portion is thus inevitably configured to have a substantially wedge shape, that is, a taper shape in cross section, which is gradually sloped from the load ball path side to the direction changing path side.

In the related art, there has been a problem in that the tapered scooping portion is damaged due to collision of balls having rolled through the load ball path. That is, the leading end of the scooping portion has a taper shape, and hence the contact area with the ball is small. Accordingly, the contact pressure with respect to the leading end of the scooping portion increases. As a result, there arises a problem in that the leading end of the scooping portion is damaged due to the collision of balls. In the motion guide device according to Patent Literature 1, in order to solve this problem, from the viewpoint of reducing the contact pressure with respect to the scooping portion, the leading end of the scooping portion is formed into a planar shape, and thus the contact area with the ball is increased.

CITATION LIST

Patent Literature

[PTL 1] JP 2004-68880 A

DISCLOSURE OF THE INVENTION

Problems to be Solved by the Invention

However, although the leading end of the scooping portion described in Patent Literature 1 is formed into a planar shape, the balls having rolled through the load ball path are guided into the direction changing path by a system of scooping the balls from the ball rolling surface of the track rail similarly to the related-art motion guide device. That is, even the motion guide device according to Patent Literature 1 adopts the system of arranging the scooping portion at the substantially wedge-shaped space formed between the ball spherical surface and the ball rolling surface formed in the track rail, and using the scooping portion to separate the balls from the ball rolling surface.

Therefore, even if the leading end of the scooping portion is formed into a planar shape, the scooping portion still has a taper shape, and when a large number of balls rolling through the endless circulation path of the moving block continuously collide with the leading end of the scooping portion, a stress concentrates onto the scooping portion. As a result, fatigue of the scooping portion is promoted, and finally the scooping portion, and therefore the end plate may be damaged. This case becomes conspicuous when the moving block is moved on the track rail at high speed.

Means for Solving the Problems

The present invention has been made in view of the above-mentioned problems, and has an object to provide a motion guide device capable of preventing an end plate from being damaged due to collision of balls having rolled through a load ball path provided between a track rail and a moving block, and thus capable of operating the moving block on the track rail at high speed.

In order to attain the above-mentioned object, according to one embodiment of the present invention, there is provided a motion guide device, including: a track member having a ball rolling surface extending in a longitudinal direction thereof; a moving member main body having a load ball rolling surface that is opposed to the ball rolling surface to form a load ball path, and a ball return path provided in parallel to the load ball path; a lid member having a direction changing path that connects the load ball path and the ball return path to each other, the lid member being fixed to an end portion of the moving member main body in a moving direction thereof; and a plurality of balls arranged in an endless circulation path including the load ball path, the ball return path, and the direction changing path.

Further, the lid member includes an introducing portion at an entrance region of the direction changing path that is connected to the load ball path. The introducing portion includes: a first contact surface that is provided adjacent to one side portion of the ball rolling surface and continuous with the direction changing path so as to intersect with the load ball path, the first contact surface guiding the plurality of balls rolling on the ball rolling surface to another side portion of the ball rolling surface; and a second contact surface located on an opposite side to the first contact surface across the ball rolling surface. The plurality of balls are guided by the first contact surface so as to be transferred from the ball rolling surface of the track member onto the second contact surface.

Effects of the Invention

In the motion guide device to which the present invention is applied, unlike the related-art motion guide device, the balls having rolled through the load ball path are guided into the direction changing path not by scooping the balls from the ball rolling surface of the track member with use of a scooping portion having a tapered leading end. The balls having rolled through the load ball path come into contact with the first contact surface that is provided continuous with the direction changing path so as to intersect with the load ball path to change the traveling direction of the balls. Thus, the balls are guided to the second contact surface to be guided into the direction changing path. Therefore, unlike the related art, it is unnecessary to provide a part that is brought into contact with the balls having rolled through the load ball path at a substantially wedge-shaped space formed between a ball rolling surface of the track member and the ball spherical surface, and accordingly the part that is brought into contact with the balls having rolled through the load ball path can be formed thick. As a result, in the motion guide device to which the present invention is applied, the lid member may be prevented from being damaged due to the collision of the balls having rolled through the load ball path, and high speed operation of the motion guide device may be achieved.

MODE FOR CARRYING OUT THE INVENTION

Now, an example of a motion guide device to which the present invention is applied is described in detail with reference to the attached drawings.

Figure 1:
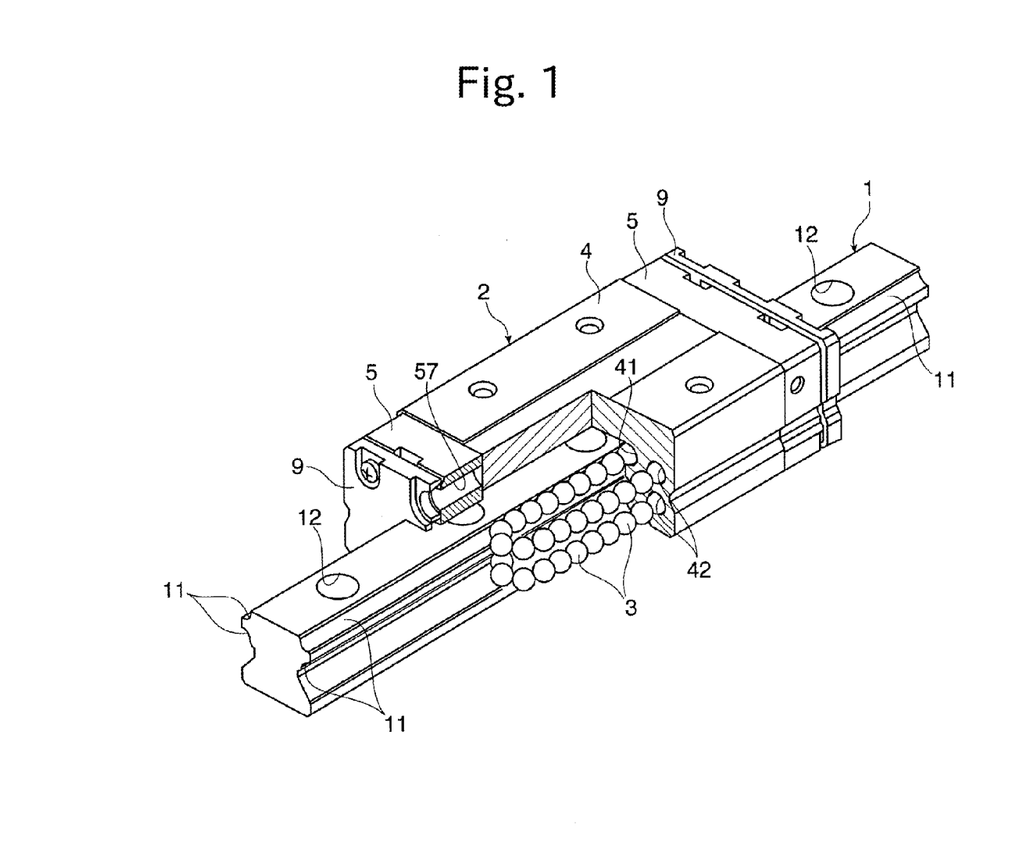
FIG. 1 is a perspective view illustrating an example of a motion guide device to which the present invention is applied.

FIG. 1 illustrates the motion guide device to which the present invention is applied. The motion guide device includes a linearly-formed track rail 1 serving as a track member, and a moving block 2 that is assembled to the track rail 1 through intermediation of a plurality of balls 3 and includes an endless circulation path for the balls 3 therein. When the balls 3 circulate in the endless circulation path of the moving block 2, the moving block 2 reciprocates on the track rail 1. Note that, in FIG. 1, for easier understanding of the internal structure of the moving block 2, a part of the moving block 2 is illustrated in a cutout manner.

The track rail 1 is formed into a substantially rectangular shape in cross section, and two ball rolling surfaces 11 on which the balls 3 roll are formed in each side surface of the track rail 1 along its longitudinal direction. Therefore, the track rail 1 has a total of four ball rolling surfaces 11 formed therein. In a cross section perpendicular to the longitudinal direction of the ball rolling surfaces 11, each of the ball rolling surfaces 11 is formed into a circular arc shape, that is, a shape including a single circular arc having a curvature radius slightly larger than a curvature radius of a ball spherical surface. Further, the track rail 1 has insertion holes 12 formed therein in a penetrated manner at appropriate intervals in the longitudinal direction so as to fix the track rail 1 to a fixing portion. Note that, the track rail 1 of this embodiment has four ball rolling surfaces 11 formed therein, but the number of the ball rolling surfaces 11 and the arrangement thereof can be set and changed as appropriate depending on the application of the motion guide device and the magnitude of the load to be applied.

On the other hand, the moving block 2 includes a block main body 4, and a pair of lid members 5 fixed to both end surfaces of the block main body 4 in its moving direction. The block main body 4 serving as a moving member main body has load ball rolling surfaces 41 that are opposed to the ball rolling surfaces 11 of the track rail 1 so as to form load ball paths for the balls 3, and ball return paths 42 for circulating the balls 3. Note that, reference numeral 9 in FIG. 1 denotes a seal member provided so as to prevent foreign matters such as dust adhering to the surface of the track rail 1 from entering the moving block 2, particularly, the endless circulation path for the balls 3.

Each of the load ball rolling surfaces 41 provided in the block main body 4 is formed into a circular arc shape similarly to the ball rolling surface 11 of the track rail 1. Those load ball rolling surfaces 41 are opposed to the respective ball rolling surfaces 11 of the track rail 1, and hence the block main body 4 has a total of four load ball rolling surfaces 41 formed therein. That is, four load ball paths are formed between the moving block 2 and the track rail 1, and the balls 3 roll through those load ball paths while applying a load.

Further, the ball return paths 42 provided in the block main body 4 are formed in parallel to the load ball rolling surfaces 41, and the block main body 4 has four ball return paths 42 formed therein. The ball return path 42 has a diameter set to be slightly larger than the diameter of the ball 3, and the balls 3 roll through the ball return paths 42 without applying a load.

On the other hand, the lid member 5 has a direction changing path formed therein so as to supply the balls 3 rolling through the load ball path while applying a load into the ball return path 42 of the block main body 4, and supply the balls 3 rolling through the ball return path 42 in a non-load state into the load ball path. As described above, the block main body 4 has four load ball paths and four ball return paths 42 formed therein, and hence a total of four direction changing paths are formed in each lid member 5 so as to connect those load ball paths and ball return paths 42.

Then, the pair of lid members 5 having the direction changing paths formed therein is fixed to both end surfaces of the block main body 4 so that the load ball paths, the ball return paths 42, and the direction changing paths communicate to each other to complete the endless circulation path for the balls 3 in the moving block 2.

Figure 2:
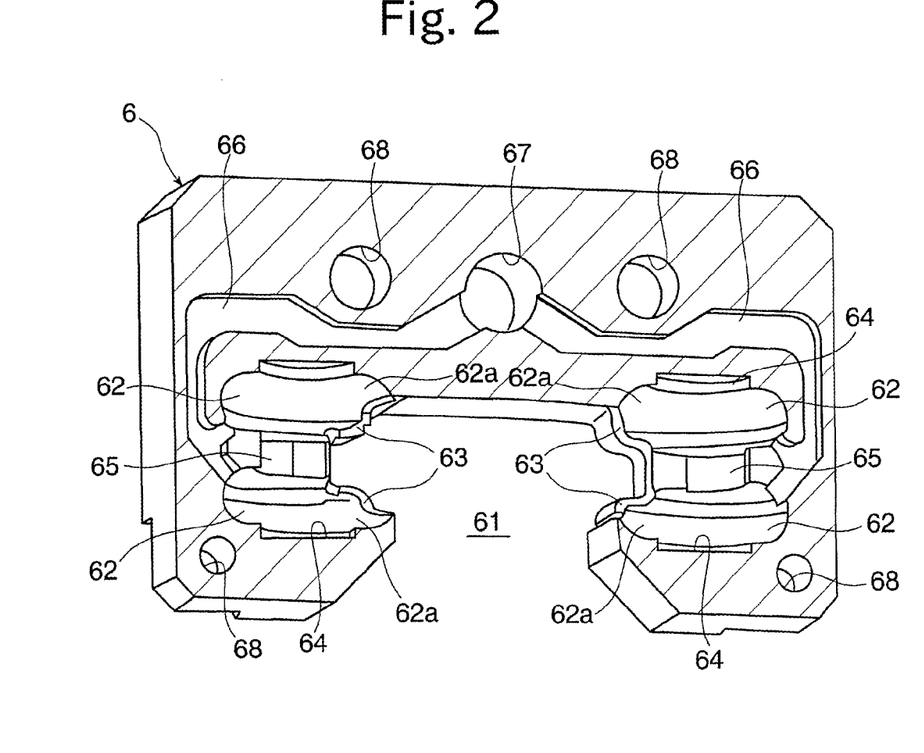
FIG. 2 is a perspective view illustrating a surface that abuts against a moving member main body of a lid member main body to which the present invention is applied.
Figure 3:
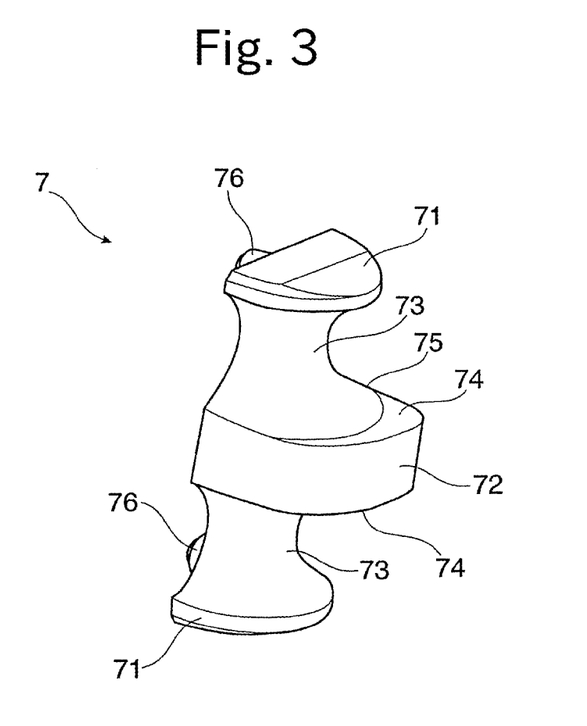
FIG. 3 is a perspective view illustrating a first embodiment of an inner peripheral member to be fitted to the lid member main body illustrated in FIG. 2.

FIGS. 2 and 3 illustrate a lid member main body 6 and an inner peripheral member 7 constituting the above-mentioned lid member 5. FIG. 2 is a perspective view illustrating a surface that abuts against the block main body 4 of the lid member main body 6, and FIG. 3 is a perspective view illustrating the inner peripheral member 7. The lid member 5 including the above-mentioned direction changing paths includes the lid member main body 6 having outer peripheral guide curved surfaces 62 of the direction changing paths formed therein, and the inner peripheral members 7 that are fitted to the lid member main body 6 to form the direction changing paths.

The lid member main body 6 has a guide groove 61 having a sectional shape slightly larger than the sectional shape of the track rail 1, and is assembled to the track rail 1 together with the block main body 4. The lid member main body 6 has four substantially semicircular outer peripheral guide curved surfaces 62 formed therein so as to guide the ball 3 in a circular arc manner between the ball return paths 42 and the ball rolling surfaces 11 of the track rail 1. Each of the outer peripheral guide curved surfaces 62 has an entrance wall portion 63 formed so as to protrude toward the guide groove 61. The entrance wall portion 63 is formed into a substantially circular arc shape along the ball rolling surface 11 formed in the track rail 1. Further, each of the outer peripheral guide curved surfaces 62 includes a first contact surface 62a that is formed so as to intersect with, in a direction of the width of the lid member main body 6, the load ball path including the ball rolling surface 11 of the track rail 1 and the load ball rolling surface 41 of the block main body 4.

Further, the lid member main body 6 has substantially semicircular recessed portions 64 formed therein. The recessed portions 64 are provided above and below a pair of the outer peripheral guide curved surfaces 62 (hereinafter referred to as "set of outer peripheral guide curved surfaces 62") that is provided in parallel to each other in a direction perpendicular to the direction of the width of the lid member main body 6. The recessed portions 64 are provided continuously with the respective outer peripheral guide curved surfaces 62. Further, the lid member main body 6 has fitting grooves 65 formed therein. Each of the fitting grooves 65 is provided between the set of outer peripheral guide curved surfaces 62. That is, the recessed portions 64 are formed in the lid member main body 6 so as to be opposed to each other across the fitting groove 65. Further, the lid member main body 6 has lubricant supply paths 66 formed therein so as to supply a lubricant into the respective direction changing paths. The lubricant supply paths 66 are communicated to an oil filler port 67 and the respective outer peripheral guide curved surfaces 62. The oil filler port 67 is configured so that a grease nipple can be fitted thereto so as to fill the lubricant supply paths 66 with the lubricant. Note that, reference numeral 68 denotes a boss hole for fixing the lid member main body 6 to a longitudinal end surface of the block main body 4. By fitting a boss formed in the block main body 4 to the boss hole 68, the lid member main body 6 is fixed to the block main body 4.

On the other hand, the inner peripheral members 7 illustrated in FIG. 3 can be fitted to the lid member main body 6. Each of the inner peripheral members 7 includes a pair of protruding portions 71 to be fitted to the substantially semicircular recessed portions 64 formed in the lid member main body 6, and a projecting portion 72 to be fitted to the fitting groove 65 provided between the set of outer peripheral guide curved surfaces 62. Inner peripheral guide surfaces 73 are formed between the projecting portion 72 and the respective protruding portions 71. Each of the inner peripheral guide surfaces 73 is opposed to the outer peripheral guide curved surface 62 of the lid member main body 6 to form the direction changing path. The projecting portion 72 projects with respect to the center line of the direction changing path toward the lid member main body 6, and a region thereof that projects with respect to the center line of the direction changing path has smooth surfaces 74 located on tangent lines of the respective inner peripheral guide surfaces 73. Each of the smooth surfaces 74 includes a second contact surface 75 that is brought into contact with the ball 3. The second contact surface 75 is provided in the smooth surface 74 at a position in the vicinity of the ball rolling surface 11.

Figure 4:
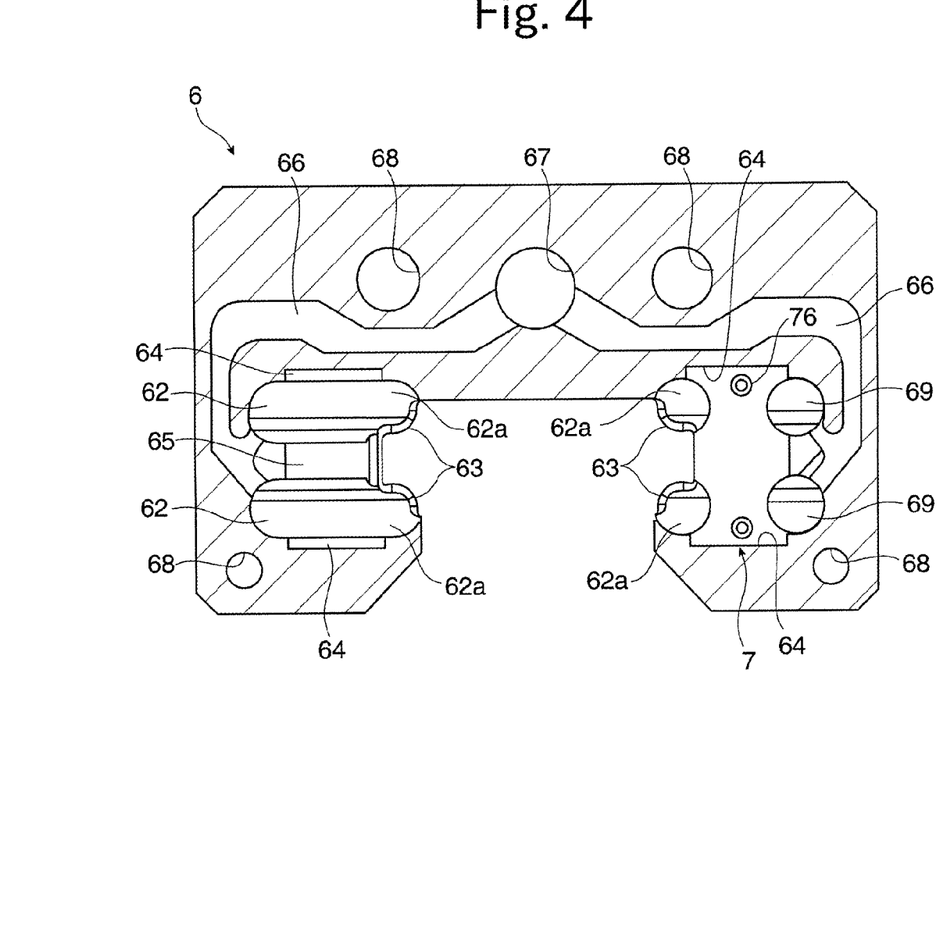
FIG. 4 is a front view illustrating a fitting state of the lid member main body illustrated in FIG. 2 and the inner peripheral member illustrated in FIG. 3.

As illustrated in FIG. 4, the pair of protruding portions 71 formed in the inner peripheral member 7 is fitted to the recessed portions 64 of the lid member main body 6, and the projecting portion 72 of the inner peripheral member 7 is fitted to the fitting groove 65 of the lid member main body 6. In this manner, the set of outer peripheral guide curved surfaces 62 formed in the lid member main body 6 and the two inner peripheral guide surfaces 73 formed in the inner peripheral member 7 are opposed to each other to complete two direction changing paths 69. Note that, a pair of bosses 76 is formed in the inner peripheral member 7 so as to fix the inner peripheral member 7 to the block main body 4. The pair of bosses 76 is formed on a surface that abuts against the block main body 4. That is, the inner peripheral member 7 is arranged between the lid member main body 6 and the block main body 4 in the longitudinal direction of the moving block 2.

Figure 5:
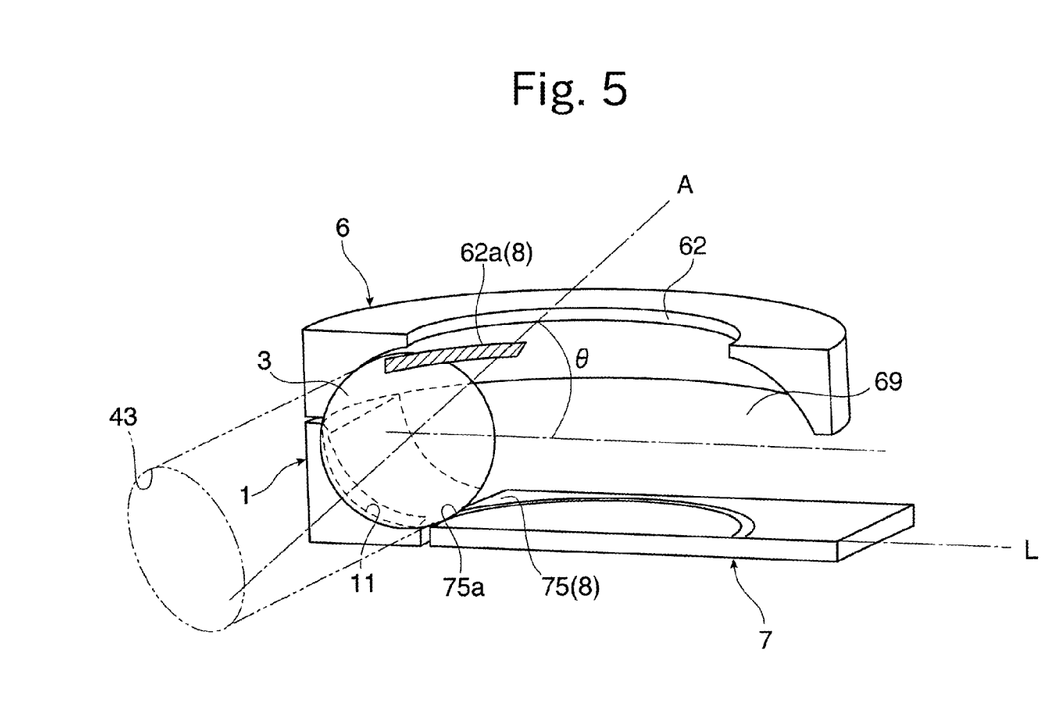
FIG. 5 is a schematic view illustrating a rolling track of a rolling element in a direction changing path of the motion guide device illustrated in FIG. 1.

FIG. 5 schematically illustrates a rolling track of the ball 3 in the direction changing path 69 including the outer peripheral guide curved surface 62 of the lid member main body 6 and the inner peripheral guide surface 73 of the inner peripheral member 7. First, in the motion guide device to which the present invention is applied, under a state in which the lid member 5 is assembled to the track rail 1, the first contact surface 62a formed in the lid member main body 6 and the second contact surface 75 formed in the inner peripheral member 7 are arranged so as to be opposed to each other across the ball rolling surface 11 of the track rail 1. Then, those lid member main body 6 and inner peripheral member 7 together form an introducing portion 8 of the direction changing path 69 that connects to the load ball path 43. That is, the introducing portion 8 includes the first contact surface 62a provided adjacent to the ball rolling surface 11 of the track rail 1 and the second contact surface 75 located on the opposite side to the first contact surface 62a across the ball rolling surface 11.

In this motion guide device, when the moving block 2 linearly moves along the track rail 1, the balls 3 roll while applying a load through the load ball path 43 including the ball rolling surface 11 of the track rail 1 and the load ball rolling surface 41 of the block main body 4. The ball 3 having rolled through the load ball path 43 first comes into contact with the first contact surface 62a of the lid member main body 6 that is formed so as to intersect with the load ball path 43. When the ball 3 comes into contact with this first contact surface 62a, the ball 3 is guided in a direction intersecting with the load ball path 43, specifically, in a direction inclined by an angle $\theta$ with respect to a direction in which a load acts on the ball 3 in the load ball path 43, that is, with respect to a contact direction A between the ball 3 and the ball rolling surface 11 of the track rail 1 as well as the load ball rolling surface 41 of the block main body 4.

The ball 3 guided by the first contact surface 62a is transferred from the ball rolling surface 11 onto the second contact surface 75 formed in the inner peripheral member 7. In this case, under a state in which the lid member 5 is assembled to the track rail 1, an end edge 75a of the second contact surface 75 that faces the track rail 1 is arranged so as to be located on a tangent line L at the edge of the ball rolling surface 11 formed in the track rail 1 on the inner peripheral member 7 side.

The ball 3 transferred onto the second contact surface 75 rolls on the outer peripheral guide curved surface 62 and the smooth surface 74 formed in the inner peripheral member 7 to be guided into the direction changing path 69. In other words, in the motion guide device to which the present invention is applied, as illustrated in FIG. 5, only by forming the first contact surface 62a and the second contact surface 75 in an entrance region of the direction changing path 69 continuous with the load ball path 43, the ball 3 can be guided into the direction changing path 69.

Figure 6:
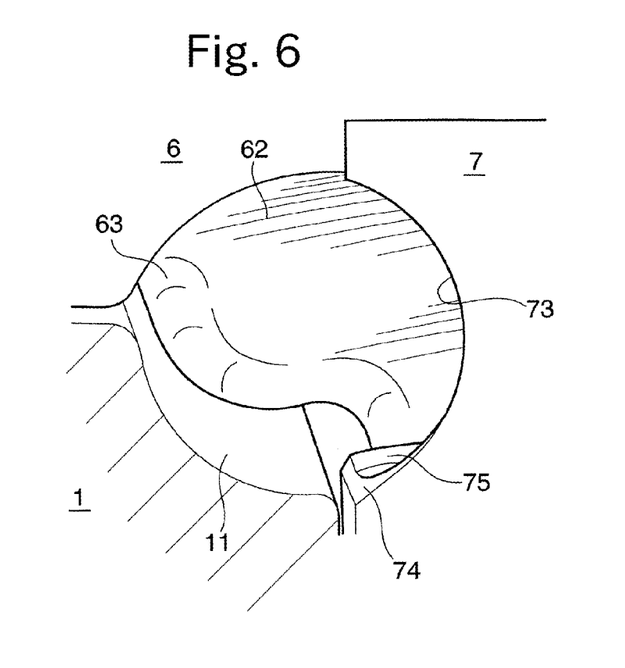
FIG. 6 is an enlarged view illustrating a fitting state of a track member and a lid member including the lid member main body illustrated in FIG. 2 and the inner peripheral member illustrated in FIG. 3.

FIG. 6 is an enlarged view illustrating the introducing portion of the direction changing path 69 under a state in which the lid member 5 is assembled to the track rail 1. Under a state in which the lid member 5 including the lid member main body 6 and the inner peripheral member 7 is assembled to the track rail 1, the entrance wall portion 63 formed in the lid member main body 6 is arranged so as to be opposed to the ball rolling surface 11 of the track rail 1 with a slight gap therebetween. The entrance wall portion 63 is formed so as to be curved along a direction in which the ball 3 rolls from the load ball path to the direction changing path 69.

As described above, in the motion guide device to which the present invention is applied, with the configuration including the first contact surface 62a formed in the lid member main body 6 and the second contact surface 75 formed in the inner peripheral member 7, the ball 3 can be guided into the direction changing path 69. Therefore, in the configuration, the entrance wall portion 63 is not illustrated in FIG. 5, but is arranged between the first contact surface 62a and the second contact surface 75.

In other words, the ball having rolled through the load ball path is guided into the direction changing path 69 without interfering with the entrance wall portion 63. As described above, this entrance wall portion 63 does not interfere with the ball 3 having rolled through the load ball path, and does not have any function of scooping the ball 3 having rolled on the ball rolling surface 11 of the track rail 1. Therefore, in the motion guide device to which the present invention is applied, the entrance wall portion 63 does not have a taper shape, but has a shape in which its leading end is thick and rounded.

According to the motion guide device to which the present invention is applied, which is formed as described above, the ball 3 having rolled through the load ball path comes into contact with the first contact surface 62a formed in the lid member main body 6 so as to intersect with the load ball path, to thereby change the traveling direction thereof. After that, the ball 3 comes into contact with the second contact surface 75 to be guided into the direction changing path 69. That is, in the motion guide device to which the present invention is applied, the ball 3 having rolled on the ball rolling surface 11 of the track rail 1 is not scooped to be guided into the direction changing path 69, unlike the related-art motion guide device. Therefore, it is not necessary to arrange the first contact surface 62a for separating the ball 3 from the load ball path at a substantially wedge-shaped space formed between the ball spherical surface and the ball rolling surface 11 of the track rail 1, unlike the related-art motion guide device.

Therefore, in the motion guide device to which the present invention is applied, the first contact surface 62a that is brought into contact with the ball 3 having rolled through the load ball path can be provided at a thick part of the lid member main body 6. As a result, damage on the lid member 5 due to the collision of the ball 3 having rolled through the load ball path can be suppressed. Further, the ball 3 having rolled through the load ball path comes into contact with the first contact surface 62a that has a secured thickness in the longitudinal direction of the lid member 5, and hence the moving block 2 can be moved on the track rail 1 at high speed.

Further, in the motion guide device to which the present invention is applied, the entrance wall portion 63 is formed between the first contact surface 62a and the second contact surface 75. The entrance wall portion 63 is formed along the direction in which the ball 3 rolls from the load ball path to the direction changing path 69 and so as to overlap with the ball rolling surface 11 of the track rail 1 with a minute gap therebetween. Therefore, even when gaps are formed among three members, specifically, the lid member main body 6, the inner peripheral member 7, and the track rail 1 as illustrated in FIG. 5, generation of a gap between the lid member 5 and the ball rolling surface 11 of the track rail 1 can be prevented, and thus foreign matters can be prevented from entering the endless circulation path for the balls 3.

Further, in the motion guide device to which the present invention is applied, the end edge 75a of the second contact surface 75 that faces the track rail 1 is located on the tangent line L at the edge of the ball rolling surface 11 formed in the track rail 1 on the inner peripheral member 7 side. Therefore, the ball 3 that has been guided by the first contact surface 62a can be smoothly transferred onto the second contact surface 75, and therefore the ball 3 can smoothly circulate through the direction changing path 69.

Figure 7:
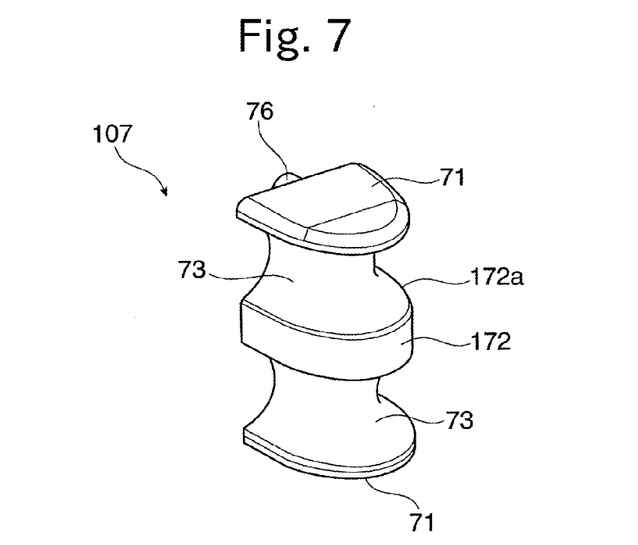
FIG. 7 is a perspective view illustrating a second embodiment of the inner peripheral member.

FIG. 7 is a perspective view illustrating a second embodiment of the inner peripheral member 7. In the configuration of an inner peripheral member 107, like configurations as those of the inner peripheral member 7 according to the first embodiment are denoted by like reference symbols, and description thereof is omitted. The inner peripheral member 107 according to this embodiment and the inner peripheral member 7 according to the first embodiment differ in the configuration of the projecting portion to be fitted to the fitting groove 65 formed in the lid member main body 6. In the inner peripheral member 7 according to the first embodiment, the projecting portion 72 is formed so as to project with respect to the center line of the direction changing path 69 toward the lid member main body 6, and the smooth surface 74 continuous with the inner peripheral guide surface 73 is formed in the projecting portion 72. Further, the second contact surface 75 that is brought into contact with the ball 3 having rolled through the load ball path is formed in the smooth surface 74 in the vicinity of the ball rolling surface 11.

In contrast, in the inner peripheral member 107 according to this embodiment, a projecting portion 172 does not project with respect to the centerline of the direction changing path 69 toward the lid member main body 6, but projects to reach a position that matches with the center line. The projecting portion 172 does not have the smooth surface 74 formed therein unlike the inner peripheral member 7 of the first embodiment, but has, as illustrated in FIG. 7, a second contact surface 172a formed therein at a peripheral edge of the projecting portion 172 in the vicinity of the ball rolling surface 11.

Figure 8:
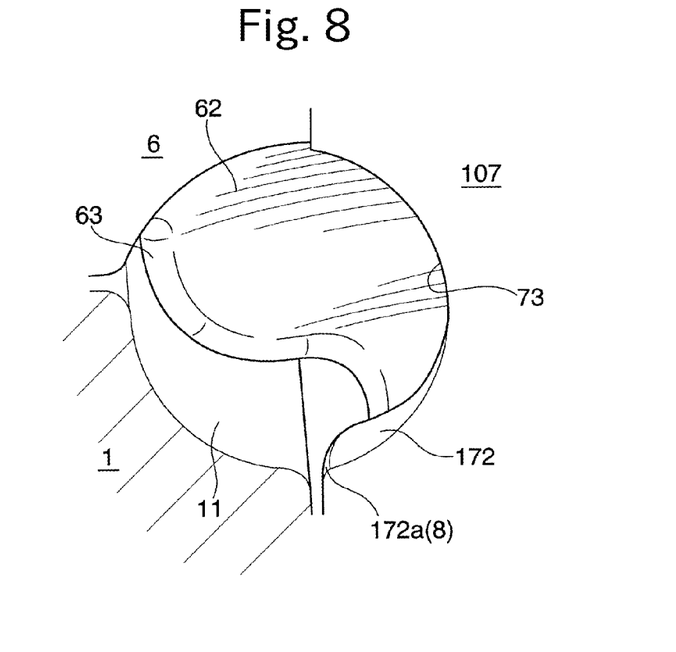
FIG. 8 is an enlarged view illustrating a fitting state of the track member and the lid member in which the inner peripheral member according to the second embodiment is fitted.

As illustrated in FIG. 8, when the inner peripheral member 107 having the above-mentioned configuration is fitted to the lid member main body 6, the inner peripheral member 107 forms, together with the lid member main body 6, the introducing portion 8 of the direction changing path 69, which connects to the load ball path. Under this state, the end edge of the second contact surface 172a that faces the track rail 1 is arranged so as to locate on the tangent line at the edge of the ball rolling surface 11 on the inner peripheral member 7 side.

Figure 9:
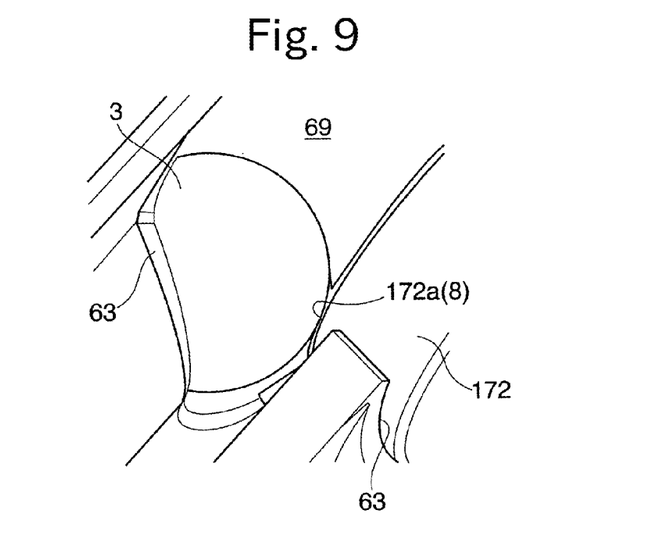
FIG. 9 is a perspective view illustrating a fitting state of the inner peripheral member according to the second embodiment and the lid member main body as viewed from the track member side.

Therefore, as illustrated in FIG. 9, the ball 3 that has been guided by the first contact surface 62a from the edge of the ball rolling surface 11 formed in the track rail 1 on the lid member main body 6 side to the edge thereof on the inner peripheral member 7 side is transferred from the ball rolling surface 11 onto the second contact surface 172a without interfering with the entrance wall portion 63 formed in the lid member main body 6, and then the ball 3 rolls through the direction changing path 69 along the peripheral edge of the projecting portion 172 including the second contact surface 172a.

Even when the inner peripheral member 107 according to the second embodiment configured as described above is used, actions and effects similar to those in the motion guide device using the inner peripheral member 7 according to the first embodiment are exerted, but in the motion guide device that uses the inner peripheral member 107 of the second embodiment, the second contact surface 172a is formed at the peripheral edge of the projecting portion 172 provided in the inner peripheral member 107, that is, a part having a small contact area with respect to the ball 3.

Figure 10:
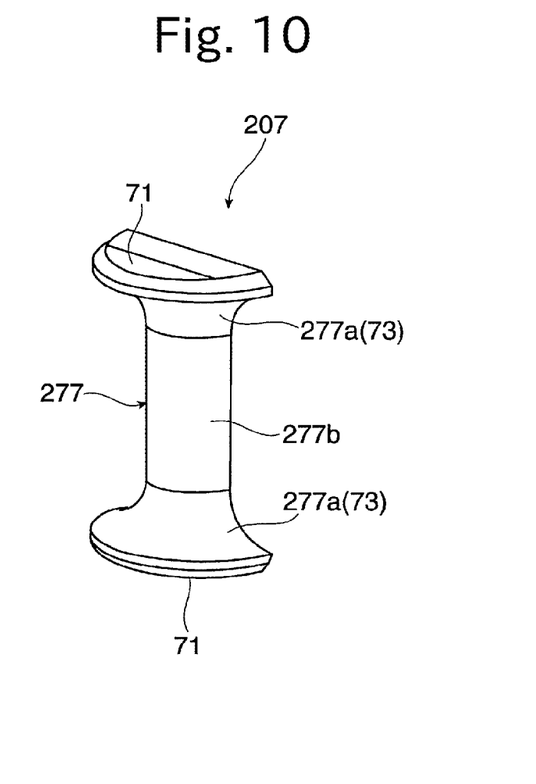
FIG. 10 is a perspective view illustrating a third embodiment of the inner peripheral member.
Figure 11:
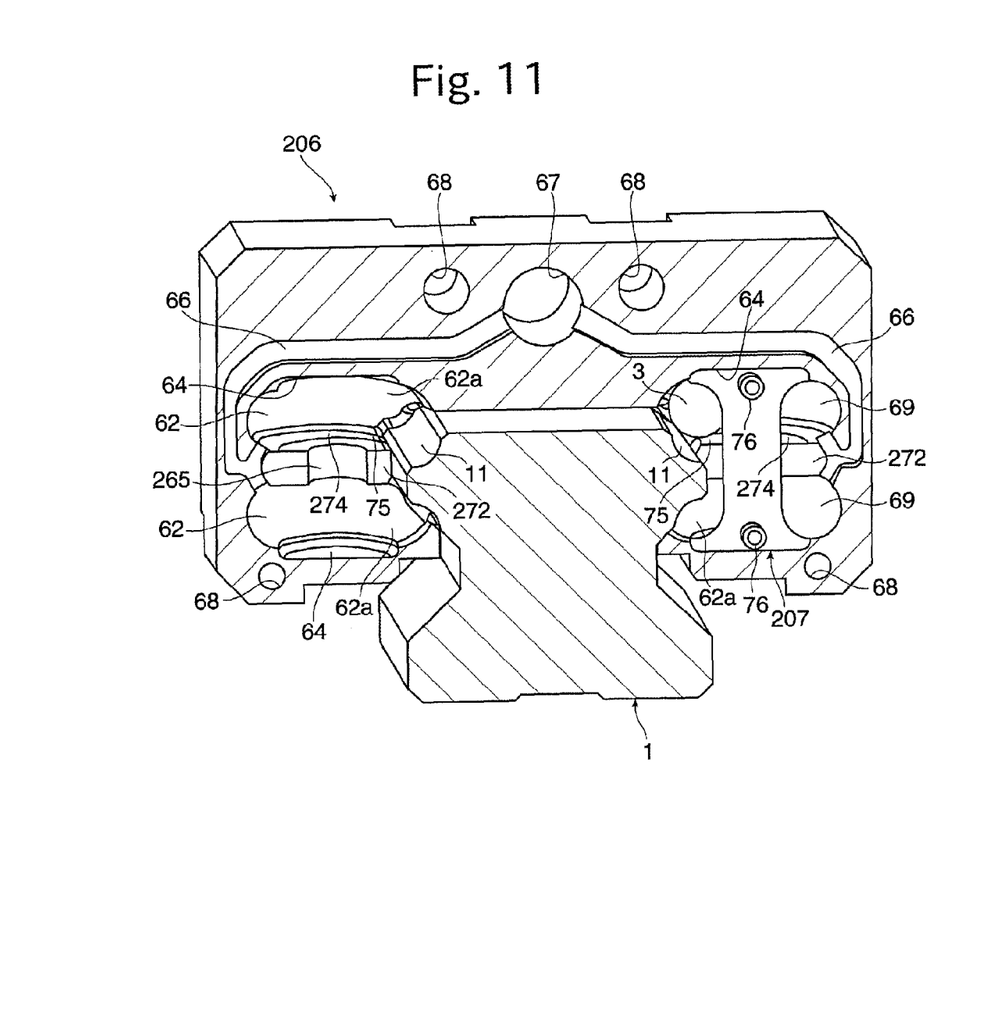
FIG. 11 is a perspective view illustrating a second embodiment of the lid member main body to which the inner peripheral member illustrated in FIG. 10 is fitted.

FIG. 10 is a perspective view illustrating a third embodiment of the inner peripheral member 7, and FIG. 11 is a perspective view illustrating a lid member main body 206 having an inner peripheral member 207 according to the third embodiment fitted thereto. In the following description of the inner peripheral member 207 and the lid member main body 206, like configurations as those in the above-mentioned inner peripheral member 7 and lid member main body 6 are denoted by like reference symbols, and description thereof is omitted. In the inner peripheral member 7 according to the first embodiment, the projecting portion 72 is formed so as to project with respect to the center line of the direction changing path 69 toward the lid member main body 6, and the smooth surface 74 continuous with the inner peripheral guide surface 73 is formed in the projecting portion 72. Further, the second contact surface 75 that is brought into contact with the ball 3 having rolled through the load ball path is formed in the smooth surface 74 in the vicinity of the ball rolling surface 11.

In contrast, the inner peripheral member 207 according to this embodiment does not include the configuration of the projecting portion having the second contact surface 75 formed therein, but only includes a semicircular portion 277 formed uniformly from one protruding portion 71 to the other protruding portion 71. The semicircular portion 277 includes guide portions 277a having the respective inner peripheral guide surfaces 73 formed therein and a fitting portion 277b to be fitted to the lid member main body 206.

On the other hand, the lid member main body 206 to which the inner peripheral member 207 configured as described above is fitted includes a configuration similar to the projecting portion 72 included in the inner peripheral member 7 illustrated in FIG. 3. That is, the lid member main body 206 according to this embodiment includes projecting portions 272 that are each formed continuous with each of the outer peripheral guide curved surfaces 62 and project with respect to the center line of the direction changing path 69 toward the inner peripheral member 207. Each of the projecting portions 272 has a smooth surface 274 formed therein, which is located on the tangent line of each of the outer peripheral guide curved surfaces 62. The smooth surface 274 is continuously provided from a connecting end with the load ball path to a connecting end with the ball return path 42. Further, in the smooth surface 274 in the vicinity of the ball rolling surface 11, the second contact surface 75 that is brought into contact with the ball 3 having rolled on the ball rolling surface 11 is formed. Further, the leading end surface of the projecting portion 272 has a fitting groove 265 formed therein so that the fitting portion 277b of the inner peripheral member 207 is fitted thereto.

That is, the lid member main body 206 of this embodiment has both of the first contact surface 62a and the second contact surface 75 formed therein, and the lid member main body 206 has the introducing portion of the direction changing path 69 formed therein. Also in the motion guide device including those lid member main body 206 and inner peripheral member 207, the ball 3 having rolled through the load ball path 43 collides with the first contact surface 62a formed in the lid member main body 206, and is then transferred onto the second contact surface 75 formed in the same lid member main body 206. After that, the ball 3 rolls through the direction changing path 69.

The motion guide device according to this embodiment configured as described above exerts effects similar to those in the above-mentioned embodiments as a matter of course. Further, both of the first contact surface 62a and the second contact surface 75 are formed in the lid member main body 206. Therefore, unlike the motion guide device according to the above-mentioned embodiments in which the introducing portion 8 is formed only when the lid member main body 6 and the inner peripheral member 7 are fitted to each other, it is unnecessary to increase the fitting accuracy between the lid member main body 206 and the inner peripheral member 207, and accordingly it is unnecessary to consider the forming accuracy of the lid member main body 206 and the inner peripheral member 207. As a result, the lid member main body 206 and the inner peripheral member 207 can be easily formed at low cost.

Note that, in the lid member main body 206 according to this embodiment, the semicircular arc shaped outer peripheral guide curved surface 62 and the smooth surface 274 are formed, and further, those outer peripheral guide curved surface 62 and smooth surface 274 are uniformly provided from the connecting end with the load ball path to the connecting end with the ball return path 42. Then, the ball 3 having rolled through the load ball path rolls through the direction changing path 69 while being held in contact with a curved surface including the outer peripheral guide curved surface 62 and a planar surface including the smooth surface 274. That is, the ball 3 rolls on a composite surface including the outer peripheral guide curved surface 62 and the smooth surface 274.

In this case, the contact angle between the outer peripheral guide curved surface 62 and the ball 3 is larger than the contact angle between the smooth surface 274 and the ball 3, and hence stress concentrates on the outer peripheral guide curved surface 62 due to the rolling of the ball 3. From the viewpoint of avoiding the stress concentration due to the rolling of the ball 3, it is sufficient that the smooth surface 274 be provided at least in an entrance region of the direction changing path 69 that is connected to the load ball path. In regions other than the entrance region of the direction changing path 69, a sectional shape in a direction perpendicular to the direction in which the ball 3 rolls may be a circular arc shape with a single curvature radius, or a Gothic arch shape in which the ball 3 is held in contact at two points. That is, in the regions other than the entrance region of the direction changing path 69 continuous with the load ball path, the contact surface of the ball 3 in the direction changing path 69 may not be formed into the composite surface but formed into a single surface.

However, from the viewpoint of regulating the behavior of the ball 3 in the direction changing path 69, it is effective to reduce the gap between the inner peripheral surface of the direction changing path 69 and the outer peripheral surface of the ball 3, and hence it is preferred that the above-mentioned sectional shape in the regions other than the entrance region of the direction changing path 69 be a circular arc shape with a single curvature radius.

The motion guide device to which the present invention is applied according to each embodiment described above includes the configuration of the first contact surface and the second contact surface configured as described above. Therefore, it is unnecessary to provide a configuration for separating the ball from the load ball path at a substantially wedge-shaped space formed between the ball spherical surface and the ball rolling surface of the track rail, and the first contact surface that is brought into contact with the ball having rolled through the load ball path can be provided in a thick part of the lid member main body. As a result, the lid member can be prevented from being damaged due to the collision of the balls having rolled through the load ball path.

That is, the present invention may at least include a track member having a rolling surface for balls, a moving member main body having a load ball rolling surface, which is opposed to the rolling surface of the track member to form a load ball path, and the ball return path, and a lid member having the direction changing path. The lid member may have a configuration including an introducing portion including the first contact surface and the second contact surface.

The present invention is applicable to, in a case of a motion guide device in which balls are endlessly circulated, a linear guide device in which the track member is linearly formed and a curved guide device in which the track member is formed into a curved shape. Further, a plurality of the endless circulation paths may be provided as long as the balls can be endlessly circulated. Further, the diameter and forming material of the ball rolling through the endless circulation path can be arbitrarily set. Further, as the configuration of the lid member, the first contact surface and the second contact surface may be formed in the same member, or the first contact surface and the second contact surface may be formed in different members so that the different members together form the introducing portion.

The invention claimed is:

1. A motion guide device, comprising:
a track member having a ball rolling surface extending in a longitudinal direction thereof;
a moving member main body having a load ball rolling surface that is opposed to the ball rolling surface to form a load ball path, and a ball return path provided in parallel to the load ball path;
a lid member having a direction changing path that connects the load ball path and the ball return path to each other, the lid member being fixed to an end portion of the moving member main body in a moving direction thereof; and
a plurality of balls arranged in an endless circulation path including the load ball path, the ball return path, and the direction changing path, wherein the lid member comprises an introducing portion at an entrance region of the direction changing path that is connected to the load ball path,
wherein the introducing portion comprises:
a first contact surface that is provided adjacent to one side portion of the ball rolling surface and continuous with the direction changing path so as to intersect with the load ball path, the first contact surface guiding the plurality of balls rolling on the ball rolling surface to another side portion of the ball rolling surface; and
a second contact surface located on an opposite side to the first contact surface across the ball rolling surface, and
wherein the plurality of balls are guided by the first contact surface so as to be transferred from the ball rolling surface of the track member onto the second contact surface.

2. The motion guide device according to claim 1,
wherein the introducing portion further comprises an entrance wall portion formed between the first contact surface and the second contact surface along a direction in which the plurality of balls roll, the entrance wall portion overlapping with the ball rolling surface of the track member, and
wherein the plurality of balls rolling on the ball rolling surface abut against the first contact surface without coming into contact with a leading edge of the entrance wall portion.

3. The motion guide device according to claim 2,
wherein the lid member comprises:
a lid member main body having an outer peripheral guide curved surface of the direction changing path formed therein; and
an inner peripheral member to be fitted to the lid member main body, the inner peripheral member having an inner peripheral guide surface of the direction changing path, and
wherein the first contact surface is provided in the lid member main body, and the second contact surface is provided in the inner peripheral member.

4. The motion guide device according to claim 3, wherein the plurality of balls are guided at the introducing portion in a direction different from a direction in which a load acts on the plurality of balls in the load ball path.

5. The motion guide device according to claim 4, wherein the second contact surface has an end edge that faces the track member and is located on a tangent line of an edge of the ball rolling surface of the track member.

6. The motion guide device according to claim 3, wherein the second contact surface has an end edge that faces the track member and is located on a tangent line of an edge of the ball rolling surface of the track member.

7. The motion guide device according to claim 2,
wherein the lid member comprises:
a lid member main body having an outer peripheral guide curved surface of the direction changing path formed therein; and
an inner peripheral member to be fitted to the lid member main body, the inner peripheral member having an inner peripheral guide surface of the direction changing path, and
wherein the first contact surface and the second contact surface are provided in the lid member main body.

* * * * *